July 25, 1967 J. R. KING ETAL 3,333,246
DELAY LINE CLOCK
Filed July 8, 1964
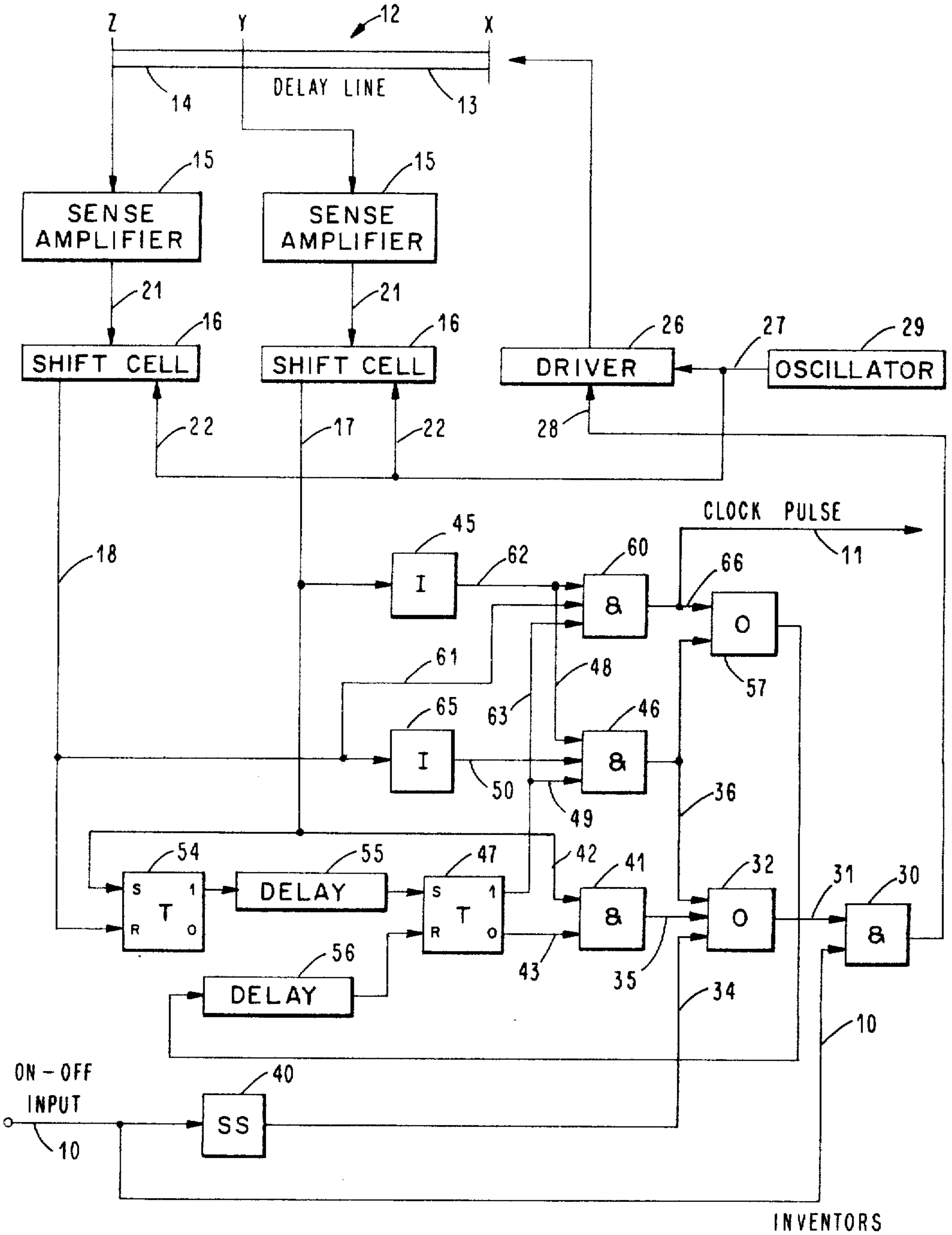
INVENTORS
JAMES R. KING
CHESTER M. PIETRAS
WILLIAM H. RICHARD
BY W. G. Robertson
ATTORNEY

United States Patent Office 3,333,246

Patented July 25, 1967

3,333,246

DELAY LINE CLOCK

James R. King, Wappingers Falls, Chester M. Pietras, Poughkeepsie, and William H. Richard, Barrytown, N.Y., assignors to International Business Machines Corporation, New York, N.Y., a corporation of New York Filed July 8, 1964, Ser. No. 381,185
6 Claims. (Cl. 340—172.5)

ABSTRACT OF THE DISCLOSURE

Timing device circulating pulses representing a binary number through a first portion of a delay line and adding to the number on each cycle such that a predetermined number on the line signifies a preselected period; circuitry associated with a second part of the delay line detects the predetermined number and signals the end of a timing period.

This invention relates generally to an electronic timing device called a clock, more specifically to a clock that can be adjusted for a wide range of clock pulse intervals.

A clock of the type that will be discussed is a device that operates with an oscillator and a counter to produce a clock pulse after a sequence of a predetermined number of oscillator cycles. One of the objects of this invention is to provide a new and improved clock circuit in which the clock period can be adjusted over a wide range; a related object is to provide a circuit that can be adjusted very simply. The period of a clock is the product of the oscillator period and the number of oscillator cycles the counter is made to respond to. It has been difficult to achieve adjustment of the clock interval over a wide range because a short clock period requires a short period oscillator and this in turn requires a counter capable of accumulating a high count value for a long clock period. The clock of this invention uses adjustable delay lines to establish each of these values.

The clock circuit of this invention includes a device that produces a series of pulses representing ones and zeros in a binary number that corresponds to the number of cycles reached during the clock period. These pulses are recirculated on a delay line. One part of the delay line is used in the process of establishing the oscillator frequency and adding to the count value on each oscillator cycle; as the pulses reach the exit of this part of the line a new series of pulses representing the next higher number is generated and fed into the entry end of the line.

The delay line has a second part that establishes the number of places in the binary number that indicates the end of a clock period. As the count on the delay line is increased, the train of pulses representing the count occupies a physically longer stretch of line. The clock has sensors connected to the line at two points that are spaced apart according to the number of bits in the preselected count value; when the series of pulses becomes long enough to stretch from one point to the other, the circuit produces a clock pulse and then begins a new period.

One important feature of the invention is that the oscillator function and the count generating junction are partly merged in a common group of components and the clock does not require a separate oscillator.

Another important feature of the clock of this invention is that its period can be adjusted by changing only the length of the delay line. The length of the first part of the delay line establishes the time interval required to add one to the binary number held on the line (the speed of the pulses along the line is kept constant); thus the clock period is directly proportional to the length of the first part of the line. The length of the second part of the line establishes the number of bits in the binary number that the two sensors respond to. Since a binary number with $n$ bits can represent the decimal number $2^n-1$ and many bits can be put on a fairly short delay line, the clock of this invention can be adjusted to have a very long period, as long as a week or so; it can also be adjusted to have a very short period. To adjust the clock period it is only necessary to adjust the length of one or both parts of the line.

A more specific feature of the clock is that the operation of producing a clock pulse is combined with the function of clearing the binary number from the line.

The drawing and the description of the preferred embodiment of the clock of this invention will suggest more detailed problems in providing a suitable clock and corresponding additional objects and features of this invention.

In the drawing the single figure is a schematic of the clock of this invention.

*Introduction.*—As the drawing shows the preferred embodiment of the invention, the clock has an on-off input 10 that is energizable to turn on the circuit to produce periodic clock pulses at an output 11. The clock includes a delay line 12 that is divided into a first part 13 and a second part 14. Preferably delay line 12 is a wire that propagates torsional pulses as is well known. The components of the circuit will be described in three overlapping groups: one group that cooperates with delay line part 13 to establish an oscillator frequency, another group that cooperates with delay line part 13 to produce a sequence of pulses representing a binary number that is increased by one during each oscillator cycle, and a third group that cooperates with the second delay line part 14 to produce a clock pulse at output 11 when the count value on the line reaches a predetermined number.

The clock operates in response to various states of the delay line at the ends of parts 13 and 14, and in the drawing the common connection of the two line parts is marked Y, the outer end of part 13 is marked X and the outer end of part 14 is marked Z. Two sets of components, each comprising a sense amplifier 15 and a shift cell 16, are coupled to line 12 at points Y and Z to produce corresponding electrical signals at outputs 17 and 18; bits at these outputs will be identified as Y and Z and the complementary values will be identified as Y' and Z'. Each sense amplifier 15 is coupled to line 12 to receive the pulses on the line and to produce a corresponding electrical signal at its output 21; each shift cell 16 has one input connected to receive the sense amplifier output 21 and another input 22 connected to receive a signal from a phase controlling oscillator 29. In response to these inputs, a shift cell 16 produces a signal at the associated output 17 or 18 that is delayed appropriately for trimming the effective length of line 12 and is shaped to correspond in phase to the oscillator input. A well known shift cell is a shift register of two stages that responds to the oscillator input to advance the data from stage to stage and thereby restores the data to synchronism.

*The oscillator.*—Some components of the drawing cooperate with delay line part 12 to form the counterpart of the oscillator in the conventional clock already described. (This oscillator is to be distinguished from the phase controlling oscillator 29.) The clock includes a driver 26 that is coupled to line 12 at point X to excite a pulse on the line in response to the state of its inputs 27, 28. Input 27 is connected to receive the output of the oscillator 29 (which also supplies inputs 22) for controlling the phase of pulses on line 12. Input 28 is connected to be controlled by an AND gate 30 having as one of its inputs the clock on-off control input 10 and having another input 31 that is connected by means of an OR gate 32 to respond to any of three signals 34, 35 or 36. Inputs 34 and 35 are associated with the circuitry that forms and circulates a tag pulse through the loop. (Input 36 is associated with components described later that form the count.)

A monostable device 40 is connected to be energized at clock input 10 whenever the clock is started and to momentarily energize input 34 of OR gate 32 to produce a tag pulse on line 12.

To recirculate the tag pulse in delay line part 13, the clock has an AND gate 41 having one input 42 connected to receive the tag and Y bits at output 17 and having another input 43 that is energizable to control the transmission of these bits to point X on line 12 through OR gate 32 and components connected to its output. Input 43 is controlled, as will be explained later, to open and close AND gate 41 for transmitting the tag and for forming the count on the line.

*Count forming means.*—The clock includes means, preferably a +1 adder, for generating a sequence of pulses representing a count value on line 12 and increasing this count value on each cycle of the tag pulse. Although the +1 adder is well known, it will be described in detail because some of its components have additional functions. When a one is added to a binary number, the right-handmost digit is changed; in a change from a one to a zero, a one is carried to the next place; carries occur at each place until the right-handmost zero is changed to a one. In other words, a +1 adder functions to invert a first group of bits and to transmit unchanged the other bits. An inverter 45 is connected to receive Y bits at output 17 and to produce the inverted signals, and two AND gates 41 (already introduced) and 46, are controlled by means of a bistable device 47 to form either Y or Y′ bits at inputs 35 and 36 of OR gate 32 for transmitting these bits to line 12. AND gate 46, which transmits the Y′ bits, has one input 48 connected to the output of inverter 45 and another input 49 connected to the set output of bistable device 47 (a third input 50 that will be described later is kept energized during the operation of adding to the count on the line). AND gate 41 receives Y bits at its input 42 as has already been explained and it has its input 43 connected to the reset output of bistable device 47.

Bistable device 47 is controlled to be in its reset state when the tag reaches output 17 for transmitting the tag through AND gate 41; it is set after the tag has been transmitted to the output of AND gate 41 and before the next bit has reached point Y for transmitting Y′ bits through AND gate 46; it is reset after the first one appears at the output of AND gate 46 for transmitting Y bits through AND gate 41 and is not again set until the beginning of the next cycle. A second bistable device 54, two delay devices 55, 56, and an OR gate 57 cooperate to control bistable device 47 through this sequence. Bistable device 54 has its set input connected to output 17 and its reset input connected to output 18 to be set at the beginning of each cycle and reset at the end of each cycle in response to the tag at points Y and Z. Delay device 55, having a delay of about ½ to ¾ bit time, connects the set output of bistable device 54 to the set input of bistable device 47; bistable device 54 functions to transmit only the tag pulse to bistable device 47 and to isolate it from any ones in the binary number. Delay device 56 and OR gate 57 cooperate to transmit the output of AND gate 46 to the reset input of bistable device 47; delay device 56 is given a delay of about ½ to ¾ bit time to allow AND gate 46 to transmit a one pulse of suitable width before it is closed.

*Count detecting means.*—Preferably, as the drawing illustrates, the circuit is arranged to produce a clock pulse in response to a predetermined sequence of pulses in which the tag appears at point Z and a one appears in each place between points Y and Z. This number is chosen to simplify clearing the line for the next period. Although this number may be made quite long, it has the distinguishing characteristic that while the tag appears as the first Z bit, the first zero appears at point Y. An AND gate 60 has its inputs connected to respond to the conditions defining this number and it has its output connected to produce a clock pulse at the circuit output 11. One input 61 of gate 60 is connected to output 18 to respond to the tag at point Z; an input 62 is connected to the output of inverter 45 to respond to the zero at point Y; and a third input 63 is connected to the set output of bistable device 47 to be energized during each cycle until bistable device 47 has been reset shortly after the first zero appears at point Y. In response to the succession of adjacent ones on the line during the last cycle, the +1 adder produces a series of zeros at the input 28 to driver 26; an inverter 65 connects input 50 of AND gate 46 to output 17 to inhibit gate 46 from transmitting a one to line 12 in response to the zero following these ones. Thus, when a pulse is produced at output 11, the line contains only the tag and it is ready to begin the next cycle.

Because AND gate 46 is kept closed throughout the last cycle, the output of AND gate 60 is connected to energize an input 66 of OR gate 57 to reset bistable device 47.

To prevent the line from simultaneously containing a one at point Z from one sequence of pulses and a first zero at point Y from a next sequence, line part 13 is made at least twice as long as line part 14.

From the detailed description of a single embodiment of the invention, those skilled in the art will recognize various modifications in components and component relationships within the spirit of the invention and the scope of the claims.

What is claimed is:

1. A timing device comprising:

a delay line adapted to propagate pulses;

means controllable to excite a pulse on said line at a first point;

means controlling said pulse exciting means to produce a tag pulse on said line at said first point and to respond to the presence of said tag at a second point to excite another tag pulse at said first point to cyclicly recirculate the tag on said line at a frequency established by the length of said line between said first and second points;

means responsive to the presence of the tag at said second point on said line to control said pulse exciting means to produce a next sequence of pulses in an order succession of pulse sequences; and means coupled to said line to respond to a sequence of pulses extending between said second point and a third point spaced from said second point in the direction of propagation to signal the end of a timing period.

2. A timing device according to claim 1 in which said means to recirculate the tag pulse includes means responsive to the presence of the tag at said third point on said line and to the next pulse at said second point to form a tag at said first point, said third point being spaced from said second point in the direction of propagation by the length of said line occupied by the longest sequence of pulses formed on the line whereby the tag pulse appears at said third point after all pulses of the corresponding sequence have passed said second point.

3. A timing device according to claim 1 in which said means to produce the succession of pulse sequences comprises a +1 adder operable to invert a first group of pulses in a sequence, the first group consisting of the first zero and any preceding ones, and to transmit unchanged any remaining terms in the count on the line.

4. A timing device according to claim 1 in which said means signaling the end of a period comprises a bistable device connected to be set at the beginning of each cycle and to be reset at about one-half bit time after the occurrence of the next zero at said second point whereby the occurrence of a pulse at said third point simultaneously with the set state of said bistable device defines a unique sequence of pulses on said line.

5. A timing device according to claim 4 in which the distance of said line between said first and second points is at least twice as great as the length between said second and third points.

6. A device according to claim 5 including means to inhibit forming a pulse on said line in response to a zero at said second point when a pulse simultaneously occurs at said third point, whereby at the end of a timing period said line contains only the tag pulse to begin a next timing period.

References Cited

UNITED STATES PATENTS

| | | | |
|---|---|---|---|
| 3,144,638 | 8/1964 | Hesler et al. | 340—173 |
| 3,223,981 | 12/1965 | Fischer | 340—172.5 |

ROBERT C. BAILEY, *Primary Examiner.*

O. E. TODD, *Assistant Examiner.*